United States Patent
Puzio et al.

(10) Patent No.: US 7,644,930 B2
(45) Date of Patent: Jan. 12, 2010

(54) MECHANISM FOR PROVIDING RESIDUAL THRUST LOAD ON CHUCK ACTUATING SCREW

(75) Inventors: Daniel Puzio, Baltimore, MD (US); Robert S. Gehret, Hampstead, MD (US); Warren A. Ceroll, Owings Mills, MD (US); Craig A. Schell, Baltimore, MD (US); Richard J. Heavel, Hanover, PA (US)

(73) Assignee: Black & Decker Inc., Newark, DE (US)

( * ) Notice: Subject to any disclaimer, the term of this patent is extended or adjusted under 35 U.S.C. 154(b) by 193 days.

(21) Appl. No.: 11/399,455

(22) Filed: Apr. 7, 2006

(65) Prior Publication Data

US 2006/0237917 A1  Oct. 26, 2006

Related U.S. Application Data

(60) Provisional application No. 60/672,862, filed on Apr. 20, 2005.

(51) Int. Cl.
*B23B 31/16* (2006.01)
(52) U.S. Cl. .................................................. 279/60
(58) Field of Classification Search ............ 279/60–62, 279/134, 135; B23B 31/16
See application file for complete search history.

(56) References Cited

U.S. PATENT DOCUMENTS

| | | | |
|---|---|---|---|
| 3,599,999 A * | 8/1971 | Schnizler et al. ............... 279/60 |
| 3,692,321 A * | 9/1972 | Shattuck ..................... 279/4.04 |
| 4,085,337 A | 4/1978 | Moeller |
| 4,456,270 A * | 6/1984 | Zettl et al. ..................... 279/62 |
| 4,702,485 A * | 10/1987 | Rohm ........................ 279/19.4 |
| 4,902,025 A * | 2/1990 | Zimdars ...................... 279/64 |
| 4,958,840 A * | 9/1990 | Palm .......................... 279/62 |
| 5,348,317 A | 9/1994 | Steadings et al. |
| 5,833,247 A * | 11/1998 | Deuschle et al. .............. 279/62 |
| 5,992,859 A * | 11/1999 | Lin .............................. 279/62 |
| 6,196,554 B1 * | 3/2001 | Gaddis et al. ................. 279/63 |
| 6,260,857 B1 * | 7/2001 | Wienhold et al. ............. 279/62 |
| 6,488,287 B2 * | 12/2002 | Gaddis et al. ................. 279/63 |
| 6,729,812 B2 * | 5/2004 | Yaksich et al. ............. 408/240 |
| 7,008,151 B2 * | 3/2006 | Yaksich et al. ............. 408/240 |
| 7,328,904 B2 * | 2/2008 | Schell et al. .................. 279/60 |
| 2001/0042965 A1 * | 11/2001 | Gaddis et al. ................. 279/62 |
| 2003/0006567 A1 * | 1/2003 | Steadings et al. ............. 279/62 |
| 2004/0021276 A1 * | 2/2004 | Allan et al. ................. 279/103 |
| 2004/0251641 A1 * | 12/2004 | Hoffmann et al. ............. 279/62 |
| 2006/0175769 A1 * | 8/2006 | Huggins et al. ............... 279/62 |

* cited by examiner

Primary Examiner—Eric A. Gates
(74) Attorney, Agent, or Firm—Capitol City TechLaw

(57) ABSTRACT

A tool chuck may include an input shaft. A chuck actuating shaft may be mounted for rotation on the input shaft. A chuck actuating screw may be screw coupled to the chuck actuating shaft. A spring may be interposed between the chuck actuating shaft and the input shaft. Upon tightening the tool chuck, the spring may be compressed to provide force against the chuck actuating screw.

19 Claims, 2 Drawing Sheets

106

MECHANISM FOR PROVIDING RESIDUAL THRUST LOAD ON CHUCK ACTUATING SCREW

CROSS REFERENCE TO RELATED APPLICATIONS

This US non-provisional application claims priority under 35 USC § 119 to U.S. Provisional Application No. 60/672, 862 filed Apr. 20, 2005, the content of which is incorporated herein in its entirety by reference.

BACKGROUND

1. Field of the Invention

Example, non-limiting embodiments of the present invention relate in general to tool chucks for attachment of accessories to power drivers, and more particularly to a tool chuck having a spring that may provide residual thrust load on a chuck actuating screw.

2. Description of Related Art

Once tight, a non-self-tightening tool chuck may loosen as the accessory material yields and the grip interface loosens.

Pusher-type tool chuck technology may be of the self-tightening variety. That is, as application torque increases, the torque tightening the tool chuck may increase to that application torque. For some applications, the tightening torque that results may be several times higher than torques achieved manually. While this tends to make the pusher-type tool chuck more costly and heavy, it may be effective at reducing accessory slip and fall out.

Some tool chucks may be actuated (to open and close the chuck jaws) via a power take off ("PTO") feature. Tool chucks with various PTO features are described in commonly-assigned, copending provisional Application entitled "TOOL CHUCK WITH POWER TAKE OFF AND DEAD SPINDLE FEATURES," filed Apr. 19, 2005, U.S. Provisional Application No. 60/672,503 (the "copending provisional application"). The content of the copending provisional application is incorporated herein in its entirety by reference.

SUMMARY

According to an example, non-limiting embodiments, a tool chuck may include an input shaft. A chuck actuating shaft may be mounted for rotation on the input shaft. A chuck actuating screw may be screw coupled to the chuck actuating shaft. A residual clamping force mechanism may be interposed between the chuck actuating shaft and the input shaft. The residual clamping force mechanism may be compressible to provide force against the chuck actuating screw.

According to another example, non-limiting embodiment, a tool chuck may include an input shaft. A chuck actuating shaft may be mounted for rotation on the input shaft. A chuck actuating screw may be screw coupled to the chuck actuating shaft. Clamping force means may be provided for compressing to provide force against the chuck actuating screw.

According to another example, non-limiting embodiments, a tool chuck may include an input shaft. A chuck actuating shaft may be mounted for rotation on the input shaft. A chuck actuating screw may be coupled to the chuck actuating shaft. A spring may be interposed between the chuck actuating shaft and the input shaft.

The above and other features of the invention including various and novel details of construction and combinations of parts will now be more particularly described with reference to the accompanying drawings. It will be understood that the details of the example embodiments are shown by way of illustration only and not as limitations of the invention. The principles and features of this invention may be employed in varied and numerous embodiments without departing from the spirit and scope of the invention.

BRIEF DESCRIPTION OF THE DRAWINGS

Example, non-limiting embodiments of the present invention will become more fully understood from the detailed description below and the accompanying drawings, wherein like elements are represented by like reference numerals, which are given by way of illustration only and thus are not limiting of the present invention.

DESCRIPTION OF EXAMPLE, NON-LIMITING EMBODIMENTS

Figure 3:
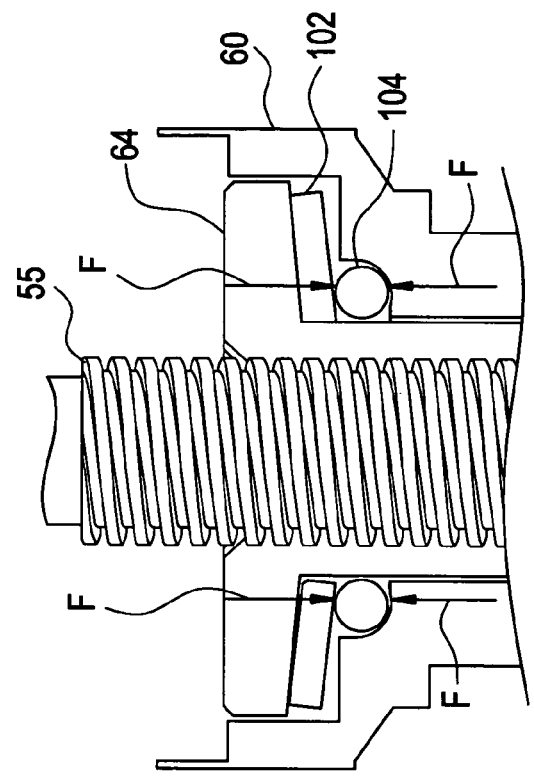
FIG. 3 is a schematic view of the tool chuck sub-assembly shown in FIG. 1 and in a tightened condition.

A PTO feature may be implemented using a pusher-type tool chuck. The pusher-type tool chuck may be non-self-tightening. The PTO system may tighten the tool chuck and then lock. To eliminate slip and fall out, the PTO system may include a residual clamping force mechanism 100 as shown in FIGS. 1-3.

Figure 1:
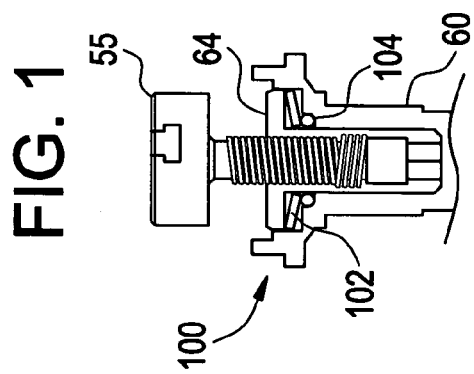
FIG. 1 is a schematic view of tool chuck sub-assembly implementing a residual clamping force mechanism according to an example, non-limiting embodiment of the present invention.
Figure 2:
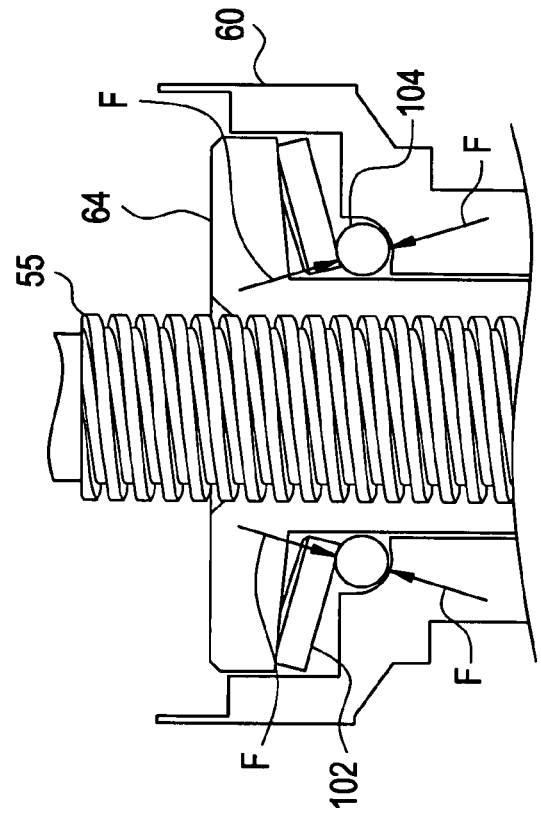
FIG. 2 is a schematic view of the tool chuck sub-assembly shown in FIG. 1 and in a loose condition.

FIG. 1 shows a portion of a tool chuck subassembly of the PTO system. Those skilled in the art will recognize the chuck actuating screw 55 and understand how it interacts with the chuck actuating shaft 64 to actuate the chuck jaws (not shown). The clamping force mechanism 100 may store energy in a compression element and then provide a residual force against the chuck actuating screw 55 (and thus the back of the chuck jaws).

By way of example only, the clamping force mechanism 100 may be in the form of a spring, which may be positioned between the pusher screw system (inclusive of the chuck actuating screw 55 and the chuck actuating shaft 64) and the input shaft 60. In this example embodiment, the spring may be a belleville spring 102. In alternative embodiments, numerous and varied springs (other than a belleville spring) that are well known in this art may be suitably implemented.

Figure 1A:
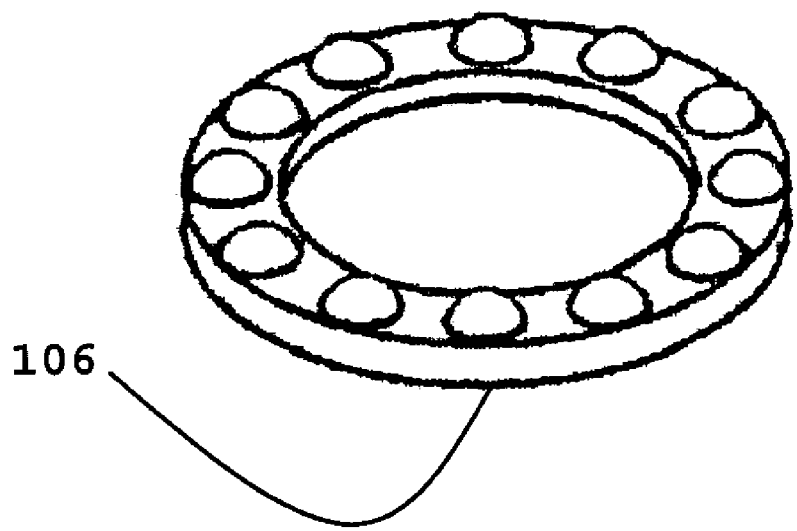
FIG. 1A is a schematic view of a thrust bearing including balls conjoined via a carrier according to an example, non-limiting embodiment of the present invention.

The clamping force mechanism 100 may be combined with a thrust bearing 104. The thrust bearing 104 may be positioned at an interface between the belleville spring 102 and the input shaft 60. The thrust bearing 104 may include a plurality of balls. The balls may be conjoined via a carrier 106 (as shown in FIG. 1A, for example), or they may be loose. In this way, the belleville spring 102 and an annular recess provided in the input shaft 60 may act as bearing races.

FIG. 2 shows the pusher screw system in a loose (or not completely tight) condition. Here, the belleville spring 102 may not be fully compressed. The lines of force acting through the thrust bearing 104 are shown as arrows F.

FIG. 3 shows the pusher screw system in a tight (or nearly tight condition). The lines of force acting through the thrust bearing 104 are shown as arrows F.

Those skilled in the art will appreciate that the pusher screw system may be tightened via a relative rotation between the chuck actuating shaft 64 and the chuck actuating screw 55, which may cause the chuck actuating screw 55 to advance axially and relative to the chuck actuating shaft 64. The translational movement of the chuck actuating screw 55 may push on the chuck jaws to close the same upon an accessory. When the chuck jaws clamp the accessory, a further relative rotation between the chuck actuating shaft 64 and the chuck actuating screw 55 may cause the chuck actuating shaft 64 to retract in an axial direction and against the influence of the belleville spring 102. As a result, the belleville spring 102 may become compressed, as shown in FIG. 3

By comparing FIGS. 2 and 3, it will be appreciated that the lines of force (arrows F) may change direction as the pusher system tightens. The input shaft 60 may include an internal torroidal surface to provide a bearing race that may accommodate this change in bearing loading as the tool chuck is tightened.

In the disclosed example embodiments, the residual clamping force mechanism 100 is in the form of a spring. In alternative embodiments, numerous and varied structures (other than springs) may be suitably implemented as the residual clamping force mechanism. Such structures may include, but are not limited to a gas filled bladder and an elastically deformable body. Such alternative structures may be combined with the thrust bearing 104 by providing such structures with a washer (for example) that may serve as a bearing race.

What is claimed is:

1. A tool chuck comprising:
   an input shaft;
   a chuck actuating shaft mounted for rotation on the input shaft;
   a chuck actuating screw that is screw coupled to the chuck actuating shaft; and
   a residual clamping force mechanism interposed between the chuck actuating shaft and the input shaft;
   the residual clamping force mechanism being compressible to provide force against the chuck actuating screw;
   the residual clamping force mechanism being spaced apart from the chuck actuating screw, such that the residual clamping force mechanism and the chuck actuating screw do not contact each other.

2. The tool chuck according to claim 1, further comprising:
   a thrust bearing interposed between the residual clamping force mechanism and the input shaft.

3. The tool chuck according to claim 2, wherein the thrust bearing is a plurality of rolling elements.

4. The tool chuck according to claim 3, wherein the plurality of rolling elements is provided in a carrier.

5. The tool chuck according to claim 1, wherein the residual clamping force mechanism is a spring.

6. The tool chuck according to claim 5, wherein the spring is a belleville spring.

7. The tool chuck according to claim 1, wherein the residual clamping force mechanism is compressible to provide axial force against the chuck actuating screw.

8. A tool chuck comprising:
   an input shaft;
   a chuck actuating shaft mounted for rotation on the input shaft;
   a chuck actuating screw that is screw coupled to the chuck actuating shaft; and
   clamping force means for compressing to provide force against the chuck actuating screw;
   the clamping force means being spaced apart from the chuck actuating screw, such that the clamping force means and the chuck actuating screw do not contact each other.

9. The tool chuck according to claim 8, further comprising:
   a thrust bearing interposed between the clamping force means and the input shaft.

10. The tool chuck according to claim 9, wherein the thrust bearing is a plurality of rolling elements.

11. The tool chuck according to claim 10, wherein the plurality of rolling elements is provided in a carrier.

12. The tool chuck according to claim 8, wherein the clamping force means is a spring.

13. The tool chuck according to claim 12, wherein the spring is a belleville spring.

14. The tool chuck according to claim 8, wherein the clamping force means is for compressing to provide axial force against the chuck actuating screw.

15. A tool chuck comprising:
   an input shaft;
   a chuck actuating shaft mounted for rotation on the input shaft;
   a chuck actuating screw coupled to the chuck actuating shaft; and
   a spring interposed between the chuck actuating shaft and the input shaft to provide axial force against the chuck actuating screw;
   the spring being spaced apart from the chuck actuating screw, such that the spring and the chuck actuating screw do not contact each other.

16. The tool chuck according to claim 15, further comprising:
   a thrust bearing interposed between the spring and the input shaft.

17. The tool chuck according to claim 16, wherein the thrust bearing is a plurality of rolling elements.

18. The tool chuck according to claim 17, wherein the plurality of rolling elements is provided in a carrier.

19. The tool chuck according to claim 15, wherein the spring is a belleville spring.

* * * * *